US010873122B2

(12) United States Patent
Lin et al.

(10) Patent No.: US 10,873,122 B2
(45) Date of Patent: Dec. 22, 2020

(54) COMMUNICATION DEVICE

(71) Applicant: ASUSTeK COMPUTER INC., Taipei (TW)

(72) Inventors: Po-Wei Lin, Taipei (TW); Chen-Min Yang, Taipei (TW); Tsung-Hsun Hsieh, Taipei (TW); Chun-Chieh Lin, Taipei (TW); Huan-Jyun Jiang, Taipei (TW); Zih-Guang Liao, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 616 days.

(21) Appl. No.: 15/611,797

(22) Filed: Jun. 2, 2017

(65) Prior Publication Data

US 2017/0358846 A1    Dec. 14, 2017

(30) Foreign Application Priority Data

Jun. 8, 2016   (CN) .................... 2016 2 0556151 U

(51) Int. Cl.
| | |
|---|---|
| *H01Q 1/24* | (2006.01) |
| *H01Q 5/335* | (2015.01) |
| *H01Q 5/50* | (2015.01) |
| *H01Q 1/48* | (2006.01) |
| *H01Q 1/52* | (2006.01) |

(52) U.S. Cl.
CPC ............ *H01Q 1/243* (2013.01); *H01Q 1/48* (2013.01); *H01Q 1/525* (2013.01); *H01Q 5/335* (2015.01); *H01Q 5/50* (2015.01)

(58) Field of Classification Search
CPC .......... H01Q 1/243; H01Q 5/335; H01Q 5/50
See application file for complete search history.

(56) References Cited

U.S. PATENT DOCUMENTS

| | | | | |
|---|---|---|---|---|
| 9,660,327 | B2 * | 5/2017 | Yong ....................... | H02J 50/20 |
| 10,411,326 | B1 * | 9/2019 | Kuo ......................... | H01Q 1/24 |
| 2017/0033437 | A1 | 2/2017 | Ghit et al. | |

FOREIGN PATENT DOCUMENTS

| | | |
|---|---|---|
| CN | 204118254 U | 1/2015 |
| CN | 103401059 B | 8/2015 |
| CN | 104953289 A | 9/2015 |
| CN | 105098352 A | 11/2015 |

\* cited by examiner

*Primary Examiner* — Dimary S Lopez Cruz
*Assistant Examiner* — Amal Patel
(74) *Attorney, Agent, or Firm* — CKC & Partners Co., LLC

(57) ABSTRACT

A communication device is provided. The communication device comprises a metal back cover electrically connected to a system ground plane; a first antenna unit for generating a first operating frequency band of the communication device; a second antenna unit for generating a second operating frequency band of the communication device. The first antenna unit includes a first signal source electrically connected to a first metal frame via a first matching circuit. The second antenna unit includes a second signal source electrically connected to a second metal frame via a second matching circuit. The first matching circuit and the second matching circuit are configured to adjust bandwidths and frequency ratios of the first operating frequency band and the second operating frequency band.

8 Claims, 4 Drawing Sheets

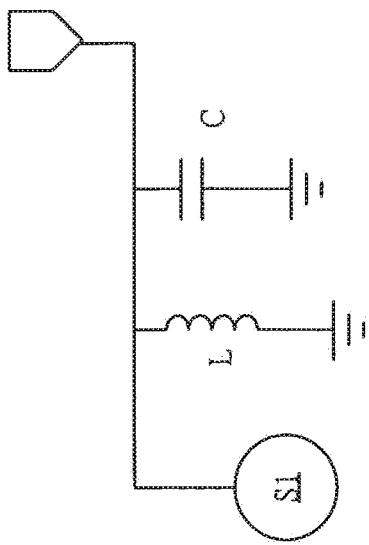
FIG. 2A
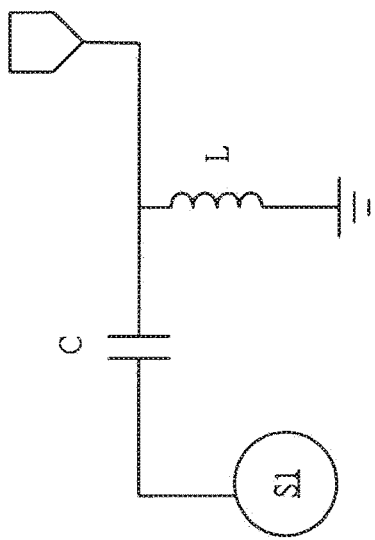
FIG. 2B
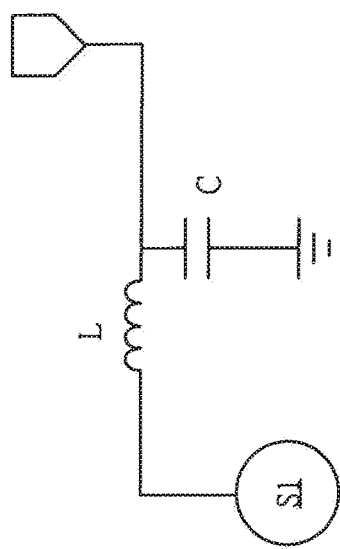
FIG. 2C
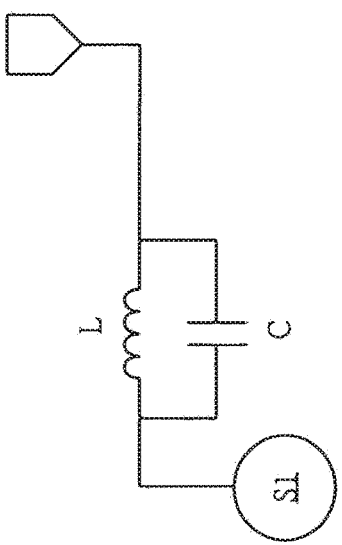
FIG. 2D
FIG. 2E
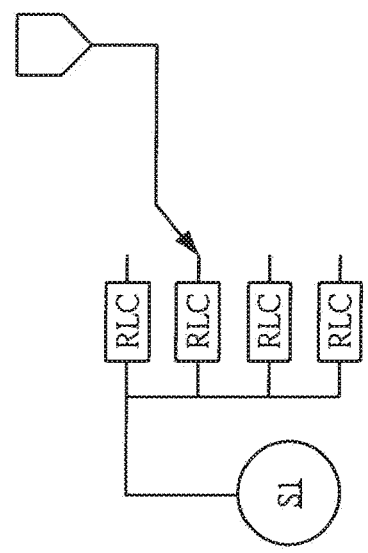
FIG. 2F

COMMUNICATION DEVICE

RELATED APPLICATIONS

This application claims the priority benefit of China application serial No. 201620556151.X, filed on Jun. 8, 2016. The entirety of the above-mentioned patent application is hereby incorporated by references herein and made a part of specification.

BACKGROUND OF THE INVENTION

Field of the Invention

The disclosure relates to a communication device and, more specifically, to a communication device with multiple operating modes.

Description of the Related Art

In general antennas of communication devices usually can only support a single operating mode. Usually, a frequency ratio of a fundamental mode and a higher order mode cannot meet the requirements of different communication protocols. Therefore, the antenna structure in the device becomes more complex to meet the communication requirements of the different communication protocols. The size and the cost of the antenna are also increased.

BRIEF SUMMARY OF THE INVENTION

According to an aspect of the disclosure, a communication device is provided. The communication device comprises: a metal back cover electrically connected to a system ground plane; a first antenna unit for generating a first operating frequency band of the communication device; and a second antenna unit for generating a second operating frequency band of the communication device. The first antenna unit includes: a first metal frame connected to the metal back cover via a first connecting portion and connected to the system ground plane via an active circuit; and a first signal source electrically connected to the first metal frame via a first matching circuit. The second antenna unit includes: a second metal frame connected to the metal back cover via a second connecting portion; and a second signal source electrically connected to the second metal frame via a second matching circuit. A first gap is formed between the second metal frame and the first metal frame. The first matching circuit and the second matching circuit are configured to adjust bandwidths and frequency ratios of the first operating frequency band and the second operating frequency band.

According to another aspect of the disclosure, a communication device is further provided. The communication device comprises: a metal back cover electrically connected to a system ground plane; a main antenna metal frame structure including a first metal frame, a second metal frame and a third metal frame; a first active circuit; and a plurality of main antenna signal sources configured to operate at a plurality of main antenna operating frequency bands, respectively. The first metal frame is connected to the system ground plane via the first active circuit. A first gap is formed between the first metal frame and the second metal frame. A second gap is formed between the second metal frame and the third metal frame. The main antenna signal sources are electrically connected to the first metal frame, the second metal frame and the third metal frame via a plurality of main antenna matching circuits, respectively. The main antenna matching circuit is configured to adjust a bandwidth and a frequency ratio of the main antenna operating frequency band.

BRIEF DESCRIPTION OF THE DRAWINGS

These and other features, aspects and advantages of the disclosure will become better understood with regard to the following embodiments and accompanying drawings.

FIG. 2A to FIG. 2F are schematic diagrams showing a matching circuit in embodiments;

DETAILED DESCRIPTION OF THE EMBODIMENTS

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure.

The term "connect/couple" used in the disclosure refers to that two or more components are electrically connected/coupled to each other, or cooperate or interact with each other. Moreover, the terms "first", "second" and the like are used for distinguishing components or operations that have the same technical name. Unless defined otherwise, the terms "first", "second" and the like do not indicate/imply the sequence, and are not used for limiting the disclosure.

Figure 1:
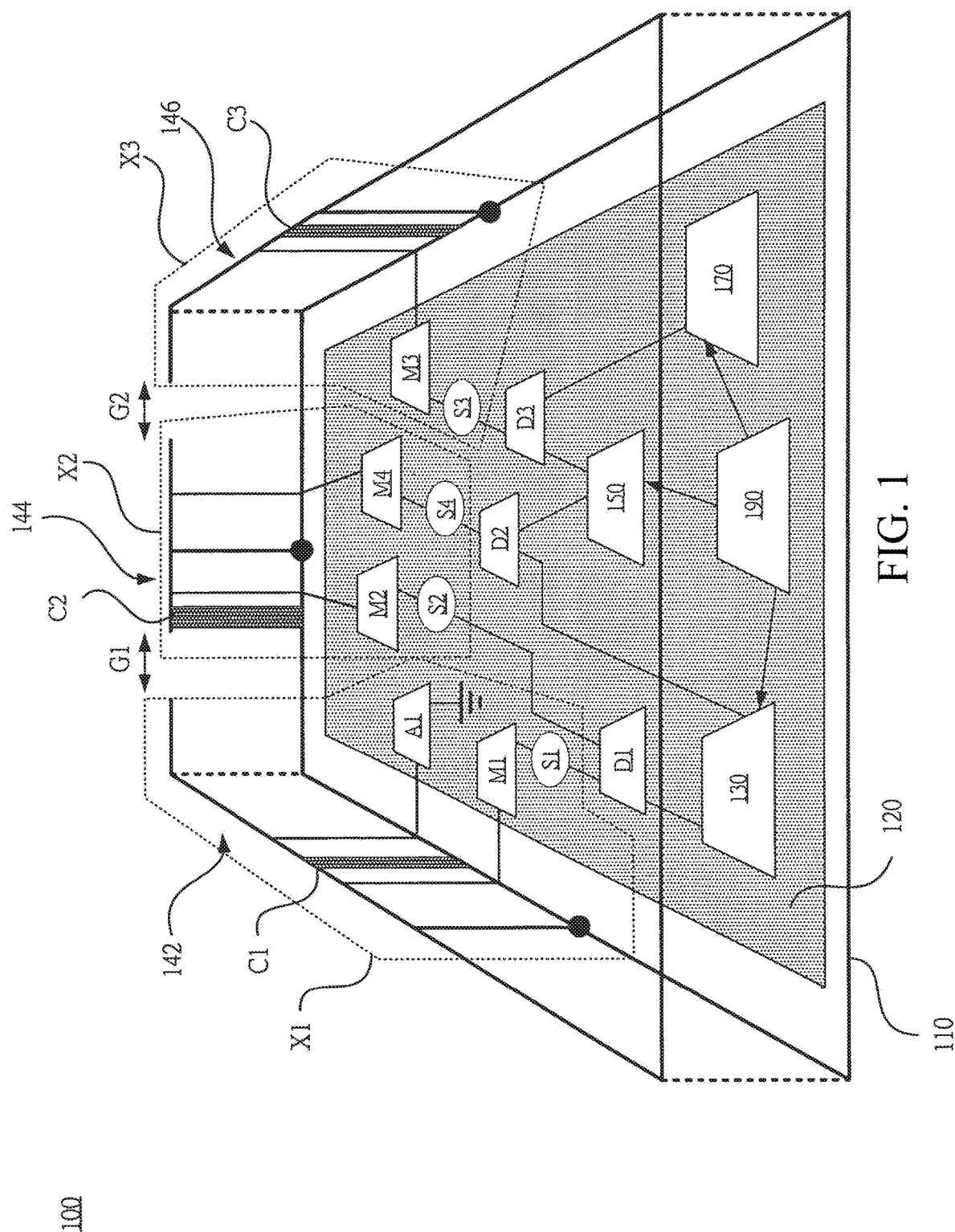
FIG. 1 is a perspective view of a communication device in an embodiment.

Please refer to FIG. 1. FIG. 1 is a perspective view of a communication device 100 in an embodiment. As shown in FIG. 1, a communication device 100 includes a metal back cover 110, a system ground plane 120, a wireless communication module 130, a wireless network module 150, a global positioning system (GPS) module 170, a processing module 190, and antenna units X1 to X3. In an embodiment, the metal back cover 110 is electrically connected to the system ground plane 120. The antenna unit X1 is used for generating a first operating frequency band for the communication device 100. The antenna unit X2 is used for generating a second operating frequency band for the communication device 100. The antenna unit X3 is used for generating a third operating frequency band for the communication device 100. In an embodiment, the antenna unit X1 corresponds to a low frequency band, such as about 698 MHz to 960 MHz. The antenna unit X2 corresponds to a medium frequency band, such as about 1710 MHz to 2300 MHz. The antenna unit X3 corresponds to a GPS and/or 5 GHz Wi-Fi operating frequency band. In an embodiment, the antenna unit X2 is further used for generating a fourth operating frequency band for the communication device 100. In an embodiment, the fourth operating frequency band corresponds to a high frequency band (such as about 2300 MHz to 2690 MHz) and/or a 2.4 GHz Wi-Fi operating frequency band.

As shown in FIG. 1, in an embodiment, the antenna unit X1 includes a metal frame 142 and a signal source S1. In an embodiment, the metal frame 142 is connected to the metal back cover 110 via a connecting portion C1. The metal frame 142 is connected to the system ground plane 120 via an active circuit A1. The signal source S1 is electrically connected to the metal frame 142 via a matching circuit M1. The matching circuit M1 is used for adjusting the bandwidth of the first operating frequency band and the frequency ratio of a mode generated by the antenna unit X1. Thus, the signal source S1 can operate at the first operating frequency band to transmit and receive signals via the metal frame 142. In an embodiment, the active circuit A1 includes various switching components.

In an embodiment, the antenna unit X2 includes a metal frame 144 and signal sources S2 and S4. In an embodiment, the metal frame 144 is connected to the metal back cover 110 via a connecting portion C2. As shown in FIG. 1, a gap G1 is formed between the metal frame 144 and the metal frame 142. The signal source S2 is electrically connected to the metal frame 144 via a matching circuit M2. The matching circuit M2 is used for adjusting the bandwidth of the second operating frequency band and the frequency ratio of a mode generated by the antenna unit X2. The signal source S4 is electrically connected to the metal frame 144 via a matching circuit M4. The matching circuit M4 is used for adjusting the bandwidth and the frequency ratio of the fourth operating frequency band. Thus, the signal sources S2 and S4 operate at the second operating frequency band and the fourth operating frequency band respectively, to transmit and receive signals via the metal frame 144.

In an embodiment, the antenna unit X3 includes a metal frame 146 and a signal source S3. In an embodiment, the metal frame 146 is connected to the metal back cover 110 via a connecting portion C3. The signal source S3 is electrically connected to the metal frame 146 via a matching circuit M3. The matching circuit M3 is used for adjusting the bandwidth of the third operating frequency band and the frequency ratio of a mode generated by the antenna unit X3. Thus, the signal source S3 operates at the third operating frequency band to transmit and receive signals via the metal frame 146.

In embodiments, the matching circuits M1 to M4 are various kinds of LC circuits that are adapted to cooperate with the metal frames 142, 144 and 146. The matching circuits M1 to M4 are configured to adjust the fundamental mode and the higher order mode of the antenna units X1 to X3 to have different frequency ratios between the fundamental mode and the higher order mode. In an embodiment, the matching circuits M1 to M4 are configured to adjust the fundamental mode and the higher order mode of the antenna units X1 to X3 to increase the bandwidth of the fundamental mode or the higher order mode. In an embodiment, the matching circuits M1 to M4 are band-pass circuits, high-pass circuits, low-pass circuits or series LC circuits which include a capacitor and an inductor connected in series or in parallel, which is not limited herein.

In an embodiment, the matching circuits M1 to M4 include a variable capacitor to flexibly adjust the frequency ratios or bandwidths between the fundamental mode and the higher order mode by changing the value of the capacitor. In an embodiment, the matching circuits M1 to M4 are a single-pole-four-throw (SP4T) antenna switch.

In such a way, with the configuration of the matching circuits M1 to M4, the antenna units X1 to X3 generate multiple different operating frequency bands for the communication device 100, respectively. As a result, the communication device 100 operates at multi-frequency bands.

In an embodiment, the metal frames 142, 144 and 146 are electrically connected to the system ground plane 120 via parasitic matching circuits (not shown), respectively. In an embodiment, the parasitic matching circuit is a diode (PIN-diode) switch or a single-pole-four-throw (SP4T) antenna switch.

As shown in FIG. 1, in an embodiment, the wireless communication module 130, the wireless network module 150 and the global positioning system (GPS) module 170 of the communication device 100 transmit signals through the signal sources S1 to S4 of the antenna units X1 to X3. In an embodiment, the wireless communication module 130 includes a communication module that supports 2G/3G/4G communication protocols. The wireless network module 150 includes a wireless network module that supports 2.4G/5G WiFi communication protocols. The global positioning system (GPS) module 170 includes a GPS module that supports GPS communication protocol.

As shown in FIG. 1, in an embodiment, the wireless communication module 130 is electrically connected to the signal source S1 and the signal source S2 selectively via a duple circuit D1. The wireless communication module 130 is electrically connected to the signal source S4 selectively via a duplex circuit D2. The wireless network module 150 is electrically connected to the signal source S4 selectively via the duplex circuit D2. The wireless network module 150 is electrically connected to the signal source S3 selectively via a duplex circuit D3. The global positioning system (GPS) module 170 is electrically connected to the signal source S3 selectively via the duplex circuit D3.

In other words, either the signal source S1 or the signal source S2 is electrically connected to the wireless communication module 130 by switching the duplex circuit D1. When the wireless communication module 130 is electrically connected to the signal source S1, the wireless communication module 130 transmits signals at the first operating frequency band (such as the low frequency band at about 698 MHz to 960 MHz). When the wireless communication module 130 is electrically connected to the signal source S2, the wireless communication module 130 transmits signals at the second operating frequency band (such as the medium frequency band at about 1710 MHz to 2300 MHz).

Similarly, the signal source S4 is electrically connected to either the wireless communication module 130 or the wireless network module 150 by switching the duplex circuit D2. When the wireless communication module 130 is electrically connected to the signal source S4, the wireless communication module 130 transmits signals at the fourth operating frequency band (such as the high frequency band at about 2300 MHz to 2690 MHz). When the wireless network module 150 is electrically connected to the signal source S4, the wireless network module 150 transmits signals at the fourth operating frequency band (such as the high frequency band at about 2300 MHz to 2690 MHz). In an embodiment, the wireless network module 150 transmits 2.4 GHz Wi-Fi signals. In such a way, the wireless communication module 130 is selectively connected to the signal source S4 to transmit high-frequency signals, or the wireless network module 150 is selectively connected to the signal source S4 to transmit 2.4 GHz Wi-Fi signals.

Similarly, the signal source S3 is electrically connected to either the global positioning system (GPS) module 170 or the wireless network module 150 by switching the duplex circuit D3. When the global positioning system (GPS) module 170 is electrically connected to the signal source S3, the global positioning system (GPS) module 170 transmits signals at the third operating frequency band (such as the operating frequency band of the GPS communication protocol). When the wireless network module 150 is electrically connected to the signal source S3, the wireless network module 150 transmits signals at the third operating frequency band (such as 5 GHz Wi-Fi frequency band). In such a way, the global positioning system (GPS) module 170 is selectively connected to the signal source S3 to transmit GPS signals, or the wireless network module 150 is selectively connected to the signal source S3 to transmit 5 GHz Wi-Fi signals.

In an embodiment, the processing module 190 is electrically connected to the wireless communication module 130, the wireless network module 150 and the global positioning system (GPS) module 170. The processing module 190 is electrically connected to the duplex circuits D1 to D3. Thus, the processing module 190 controls the operating state of the duplex circuit D1 and the duplex circuit D2 to control the signal transmission of the wireless communication module 130 through one of the signal source S1, the signal source S2 and the signal source S4.

In an embodiment, the wireless communication module 130 transmits signals through the signal sources S1 and S4, or through the signal sources S2 and S4. In other words, in an embodiment, the wireless communication module 130 transmits signals at the first operating frequency band (such as the low frequency band at about 698 MHz to 960 MHz) and the fourth operating frequency band (such as the high frequency band at about 2300 MHz to 2690 MHz), or transmits signals at the second operating frequency band (such as the medium frequency band at about 1710 MHz to 2300 MHz) and the fourth operating frequency band (such as the high frequency band at about 2300 MHz to 2690 MHz). Thus, the carrier aggregation (CA) technology in LTE communication protocol is implemented by the wireless communication module 130 with integrated bandwidths of multiple distributed frequency bands to improve the efficiency of the data transmission.

In an embodiment, the processing module 190 controls the operating states of the duplex circuit D2 and the duplex circuit D3 to control the signal transmission of the wireless network module 150 through one of the signal source S3 and the signal source S4. Similarly, the processing module 190 controls the operating state of the duplex circuit D3 to control the signal transmission of the global positioning system (GPS) module 170 through the signal source S3.

In an embodiment, when the processing module 190 controls the signal transmission of the wireless network module 150 through the signal source S3, the wireless network module 150 transmits 5 GHz Wi-Fi signals. When the processing module 190 controls the signal transmission of the wireless network module 150 through the signal source S4, the wireless network module 150 transmits 2.4 GHz Wi-Fi signals.

Please refer to FIG. 2A to FIG. 2F. FIG. 2A to FIG. 2F are schematic diagrams showing a matching circuit M1 in embodiments. As shown in FIG. 2A, in an embodiment, a matching circuit M1 is a band-pass circuit which includes a capacitor C and an inductor L connected in parallel. As shown in FIG. 2B, in an embodiment, the matching circuit M1 is a high-pass circuit which includes the capacitor C and the inductor L. As shown in FIG. 2C, in an embodiment, the matching circuit M1 is a low-pass circuit which includes the capacitor C and the inductor L. As shown in FIG. 2D, in an embodiment, the matching circuit M1 is a band-stop circuit which includes the capacitor C and the inductor L that are connected in parallel. As shown in FIG. 2E, in an embodiment, the matching circuit M1 is a series LC circuit which includes the capacitor C and the inductor L that are connected in series. As shown in FIG. 2F, in an embodiment, the matching circuit M1 includes a single-pole-four-throw (SP4T) antenna switch.

In an embodiment, the capacitor C shown in FIG. 2B and FIG. 2C is a variable capacitor for flexibly adjusting different frequency ratios or bandwidths of the fundamental mode and the higher order mode by changing the value of the capacitor.

The circuit topologies of the matching circuits M2 to M4 are similar to that of the matching circuit M1. The circuit topologies of the matching circuits M2 to M4 are the LC circuits or the single pole four throw (SP4T) antenna switches shown in FIG. 2A to FIG. 2F, the details of which are not repeated herein.

Figure 3B:
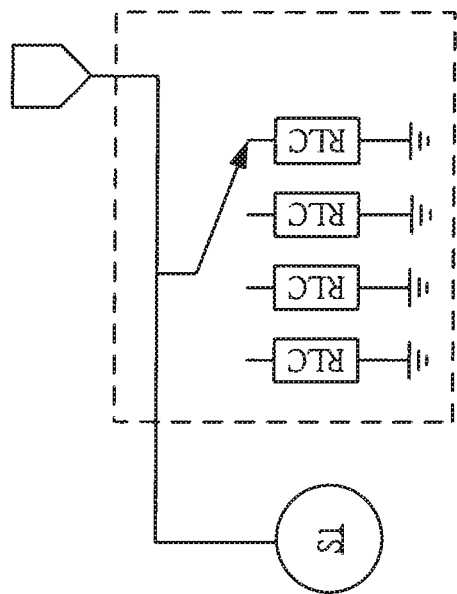
FIG. 3A and FIG. 3B are schematic diagrams showing a parasitic matching circuit in embodiments.
Figure 3A:
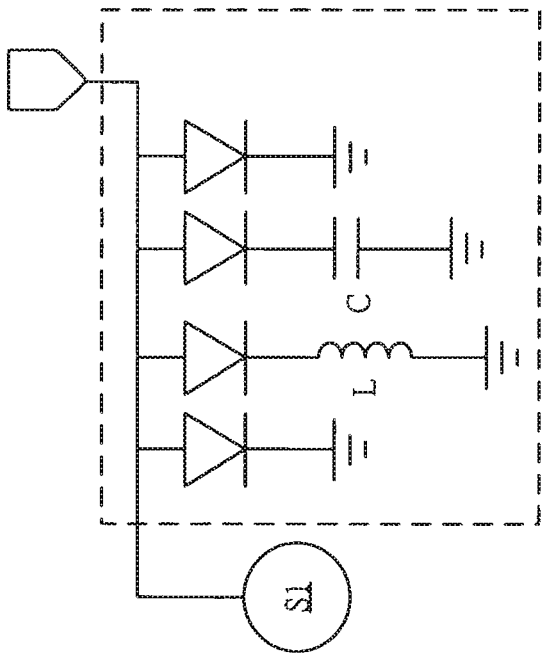

Please refer to FIG. 3A and FIG. 3B. FIG. 3A and FIG. 3B are schematic diagrams showing a parasitic matching circuit in embodiments. In an embodiment, a parasitic matching circuit shown in FIG. 3A and FIG. 3B is electrically connected between the metal frame 142 and the system ground plane 120. As shown in FIG. 3A, in an embodiment, the parasitic matching circuit is a diode switch (PIN-diode) which includes a capacitor C and an inductor L. As shown in FIG. 3B, in an embodiment, the parasitic matching circuit is a single-pole-four-throw (SP4T) antenna switch. Similarly, in embodiments, the parasitic matching circuit shown in FIG. 3A and FIG. 3B is electrically connected between the metal frame 144 and the system ground plane 120, or electrically between the metal frame 146 and the system ground plane 120. The details of which are not described herein.

Figure 4:
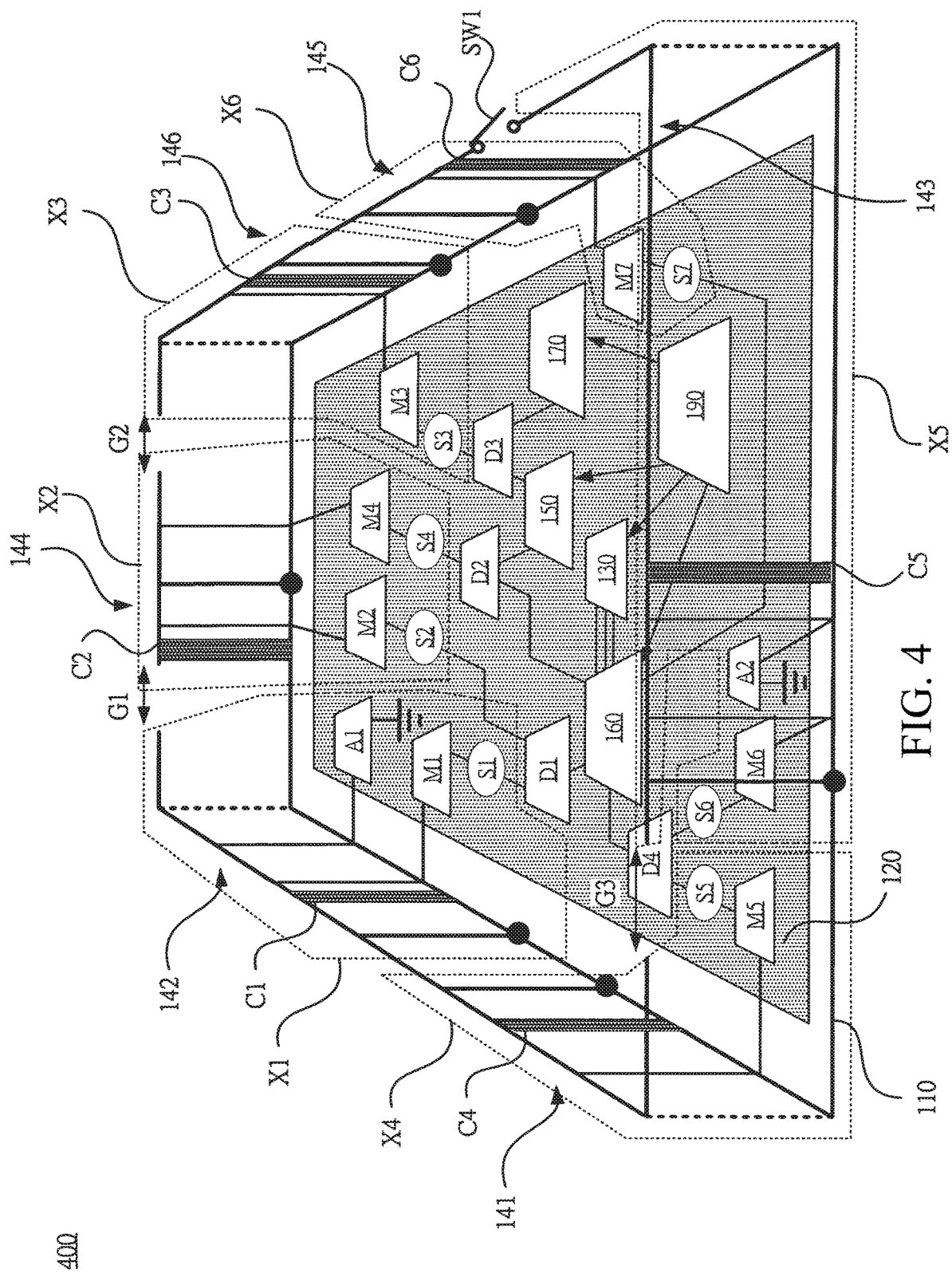
FIG. 4 is a perspective view of a communication device in an embodiment.

Please refer to FIG. 4. FIG. 4 is a perspective view of a communication device 400 in an embodiment. In FIG. 4, the component similar to that in FIG. 1 is denoted by the same reference symbol for better understanding. Generally, details for the same/similar components are not described repeatedly hereinafter.

As shown in FIG. 4, compared with the communication device 100 in FIG. 1, in addition to the antenna units X1, X2 and X3, the communication device 400 further includes antenna units X4, X5 and X6. In an embodiment, the antenna units X1, X2 and X3 at the same side of the communication device 400 are main antenna units. The corresponding metal frames 142, 144 and 146 form a main antenna metal frame structure. The signal sources S1, S2, S3 and S4 are main antenna signal sources. The antenna units X4, X5 and X6 at the opposite side of the communication device 400 relative to the main antenna units are secondary antenna units. Metal frames 141, 143 and 145 corresponding to the antenna units X4, X5 and X6 form a secondary antenna metal frame structure. Signal sources S5, S6 and S7 corresponding to the antenna units X4, X5 and X6 are secondary antenna signal sources.

In an embodiment, the antenna units X4, X5 and X6 of the secondary antenna units generate the operating frequency bands corresponding to the antenna units X2, X1 and X3. In an embodiment, the antenna unit X4 is used for generating the second operating frequency band for the communication device 400, such as the medium frequency band at about 1710 MHz to 2300 MHz. The antenna unit X5 is used for generating the first operating frequency band for the communication device 400, such as the low frequency band at about 698 MHz to 960 MHz. The antenna unit X6 is used for generating the fourth operating frequency band for the communication device 400, such as the high frequency band at about 2300 MHz to 2690 MHz.

As shown in FIG. 4, in an embodiment, the antenna unit X4 includes the metal frame 141 and the signal source S5.

The metal frame 141 is connected to the metal back cover 110 via a connecting portion C4. The signal source S5 is electrically connected to the metal frame 141 via a matching circuit M5. The matching circuit M5 is used for adjusting the bandwidth of the second operating frequency band and the frequency ratio of a mode generated by the antenna unit X4. Similarly, the antenna unit X5 includes the metal frame 143 and the signal source S6. A gap G3 is formed between the metal frame 143 and the metal frame 141. The metal frame 143 is connected to the metal back cover 110 via a connecting portion C5. The metal frame 143 is connected to the system ground plane 120 via an active circuit A2. The signal source S6 is electrically connected to the metal frame 143 via a matching circuit M6. The matching circuit M6 is used for adjusting the bandwidth of the first operating frequency band and the frequency ratio of a mode generated by the antenna unit X5. In an embodiment, the active circuit A2 is implemented by various switches.

Similarly, the antenna unit X6 includes the metal frame 145 and the signal source S7. In an embodiment, the metal frame 145 and the metal frame 143 are electrically connected via a switch SW1. The metal frame 145 is connected to the metal back cover 110 via a connecting portion C6. The signal source S7 is electrically connected to the metal frame 145 via a matching circuit M7. The matching circuit M7 is used for adjusting the bandwidth of the fourth operating frequency band and the frequency ratio of a mode generated by the antenna unit X6.

In an embodiment, the metal frame 143 and the metal frame 145 are alternatively conducted by the switch SW1. Thus, when the signal source S6 cannot operate at the first operating frequency band only via the metal frame 143, the signal source S6 can operate at the first operating frequency band via the metal frame 143 and the metal frame 145. In other words, the switch SW1 is turned on or off according to the requirements. Thus, the operating frequency band of the signal source S6 is more flexible.

As shown in FIG. 4, compared with the communication device 100 in FIG. 1, the communication device 400 further includes an antenna switching module 160. In an embodiment, the signal source S1 and the signal source S2 are selected to be electrically connected to the antenna switching module 160 via the duplex circuit D1. In an embodiment, the signal source S4 is selected to be electrically connected to the antenna switching module 160 via the duplex circuit D2. In an embodiment, the signal source S5 and the signal source S6 are selected to be electrically connected to the antenna switching module 160 via the duplex circuit D4. In an embodiment, the signal source S7 is electrically connected to the antenna switching module 160. The wireless communication module 130 is electrically connected to the antenna switching module 160 to transmit signals via the main antenna units or the secondary antenna units that are selected by the antenna switching module 160.

Similar to the duplex circuit D1 in FIG. 1, in the embodiment, the processing module 190 controls the operating state of the duplex circuit D4. The signal source S5 or the signal source S6 is electrically connected to the antenna switching module 160 and is connected to the wireless communication module 130. When the antenna switching module 160 is electrically connected to the signal source S6, the wireless communication module 130 transmits the signals at the first operating frequency band (such as the low frequency band at about 698 MHz to 960 MHz). When the antenna switching module 160 is electrically connected to the signal source S5, the wireless communication module 130 transmits the signals at the second operating frequency band (such as the medium frequency band at about 1710 MHz to 2300 MHz). When the antenna switching module 160 is electrically connected to the signal source S7, the wireless communication module 130 transmits the signals at the third operating frequency band (such as the medium frequency band at about 2300 MHz to 2690 MHz). Thus, the wireless communication module 130 transmits the signals through the signal source S5, the signal source S6, or the signal source S7.

In the embodiment, the processing module 190 is electrically connected to the antenna switching module 160 and the wireless communication module 130 to control the operating states of the duplex circuit D1, the duplex circuit D2 and the duplex circuit D4 to control the signal transmission of the wireless communication module 130 through at least one of the signal source S1, the signal source S2, the signal source S4, the signal source S5, the signal source S6 and the signal source S7.

In an embodiment, the antenna switching module 160 selects the corresponding main antenna signal sources S1 to S4 or secondary antenna signal sources S5 to S7 for signal transmission according to the communication signal strength. In other words, when the communication signals received at the main antenna signal sources S1 to S4 is strong, the antenna switching module 160 switches to be connected to the main antenna units. Thus, the wireless communication module 130 transmits the signals through the main antenna signal sources S1 to S4 of the antenna units X1 to X3. When the communication signals received at the secondary antenna signal sources S5 to S7 is strong, the antenna switching module 160 switches to be connected to the secondary antenna units. Thus, the wireless communication module 130 transmits the signals through the secondary antenna signal sources S5 to S7 of the antenna units X4 to X6.

In such a way, the antenna switching module 160 and the wireless communication module 130 are controlled by the processing module 190 to operate cooperatively according to the requirements. The main antenna metal frame structure cooperates with the main antenna signal sources or the secondary antenna metal frame structure cooperates with the secondary antenna signal sources to have the signal transmission, and thus the signal strength is high.

Similar to the communication device 100 in FIG. 1, the communication device 400 also includes the wireless network module 150 and the global positioning system (GPS) module 170. Details for the wireless network module 150 and the global positioning system (GPS) module 170 are described above, which is not repeated hereinafter.

The circuit topologies of the matching circuits M5 to M7 are similar to that of the matching circuit M1. The matching circuits M5 to M7 are LC circuits or single-pole-four-throw (SP4T) antenna switches shown in FIG. 2A to FIG. 2F, details for which are not described repeatedly here.

In an embodiment, the wireless communication module 130 is connected to the antenna switching module 160 to transmit signals through the signal sources S1 and S4, the signal sources S2 and S4, the signal sources S5 and S7 or the signal sources S6 and S7. In an embodiment, similar to the embodiment in FIG. 1, the carrier aggregation (CA) technology in the LTE communication protocol is implemented by the wireless communication module 130 of the communication device 400 Bandwidths of multiple distributed frequency bands are integrated to improve the efficiency of the data transmission. Details for the implementation are not described repeatedly herein.

It is understood that the features and the circuits disclosed in the figures and the embodiments can be combined according to requirements for a man skilled in the art. The circuits shown in the figures are exemplified and simplified for illustration and better understanding, which is not used for limiting the disclosure.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A communication device comprising:
   a metal back cover electrically connected to a system ground plane;
   a first antenna unit configured to generate a first operating frequency band of the communication device, the first antenna unit includes:
      a first metal frame connected to the metal back cover via a first connecting portion and connected to the system ground plane via an active circuit ; and
      a first signal source electrically connected to the first metal frame via a first matching circuit;
   a second antenna unit configured to generate a second operating frequency band of the communication device, the second antenna unit includes:
      a second metal frame connected to the metal back cover via a second connecting portion, a first gap is formed between the second metal frame and the first metal frame; and
      a second signal source electrically connected to the second metal frame via a second matching circuit;
      wherein the first matching circuit and the second matching circuit are configured to adjust bandwidths and frequency ratios of the first operating frequency band and the second operating frequency band;
   a third antenna unit configured to generate a third operating frequency band of the communication device, the third antenna unit includes:
      a third metal frame connected to the metal back cover via a third connecting portion, a second gap is formed between the third metal frame and the second metal frame; and
      a third signal source electrically connected to the third metal frame via a third matching circuit, the third matching circuit is configured to adjust the bandwidth and the frequency ratio of the third operating frequency band;
      wherein the second antenna unit is further configured to generate a fourth operating frequency band of the communication device, wherein the second antenna unit further includes a fourth signal source electrically connected to the second metal frame via a fourth matching circuit, the fourth matching circuit is configured to adjust the bandwidth and the frequency ratio of the fourth operating frequency band;
   a wireless communication module electrically connected to the first signal source or the second signal source selectively via a first duplex circuit, and electrically connected to the fourth signal source selectively via a second duplex circuit; and
   a processing module electrically connected to the wireless communication module, configured to control the first duplex circuit and the second duplex circuit to control signal transmission of the wireless communication module through one of the first signal source, the second signal source and the fourth signal source.

2. The communication device according to claim 1, further comprising:
   a wireless network module electrically connected to the fourth signal source selectively via the second duplex circuit, and electrically connected to the third signal source selectively via a third duplex circuit;
   wherein the processing module is electrically connected to the wireless network module, configured to control the second duplex circuit and the third duplex circuit to control the signal transmission of the wireless network module through one of the third signal source and the fourth signal source.

3. The communication device according to claim 2, further comprising:
   a global positioning system (GPS) module electrically connected to the third signal source selectively via the third duplex circuit;
   wherein the processing module is electrically connected to the global positioning system (GPS) module, configured to control the third duplex circuit to control signal transmission of the global positioning system (GPS) module through the third signal source.

4. A communication device comprising:
   a metal back cover electrically connected to a system ground plane;
   a first antenna unit configured to generate a first operating frequency band of the communication device, the first antenna unit includes:
      a first metal frame connected to the metal back cover via a first connecting portion and connected to the system ground plane via an active circuit ; and
      a first signal source electrically connected to the first metal frame via a first matching circuit;
   a second antenna unit configured to generate a second operating frequency band of the communication device, the second antenna unit includes:
      a second metal frame connected to the metal back cover via a second connecting portion, a first gap is formed between the second metal frame and the first metal frame;
      a second signal source electrically connected to the second metal frame via a second matching circuit; and
      a fourth signal source electrically connected to the second metal frame;
      wherein the first matching circuit and the second matching circuit are configured to adjust bandwidths and frequency ratios of the first operating frequency band and the second operating frequency band;
   a third antenna unit configured to generate a third operating frequency band of the communication device, the third antenna unit includes:
      a third metal frame connected to the metal back cover via a third connecting portion, a second gap is formed between the third metal frame and the second metal frame; and
      a third signal source electrically connected to the third metal frame via a third matching circuit, the third matching circuit is configured to adjust the bandwidth and the frequency ratio of the third operating frequency band;
   a fourth antenna unit configured to generate the second operating frequency band of the communication device, the fourth antenna unit includes:

a fourth metal frame connected to the metal back cover via a fourth connecting portion; and
a fifth signal source electrically connected to the fourth metal frame via a fifth matching circuit; and
a fifth antenna unit configured to generate the first operating frequency band of the communication device, the fifth antenna unit includes:
a fifth metal frame connected to the metal back cover via a fifth connecting portion, and connected to the system ground plane via a second active circuit, a third gap is formed between the fifth metal frame and the fourth metal frame; and
a sixth signal source electrically connected to the fifth metal frame via a sixth matching circuit;
wherein the fifth matching circuit and the sixth matching circuit are configured to adjust the bandwidths and the frequency ratios of the second operating frequency band and the first operating frequency band.

5. The communication device according to claim 4, further comprising:
a sixth antenna unit configured to generate a fourth operating frequency band of the communication device, the sixth antenna unit includes:
a sixth metal frame connected to the metal back cover via a sixth connecting portion; and
a seventh signal source electrically connected to the sixth metal frame via a seventh matching circuit, and the seventh matching circuit is configured to adjust the bandwidth and the frequency ratio of the fourth operating frequency band.

6. The communication device according to claim 5, further comprising:
a switch configured to alternatively conduct the fifth metal frame and the sixth metal frame to allow the sixth signal source to operate at the first operating frequency band.

7. The communication device according to claim 5, wherein the communication device further includes:
an antenna switching module electrically connected to the first signal source and the second signal source selectively via a first duplex circuit, electrically connected to the fourth signal source selectively via a second duplex circuit, electrically connected to the fifth signal source and the sixth signal source selectively via a fourth duplex circuit, and electrically connected to the seventh signal source;
a wireless communication module electrically connected to the antenna switching module; and
a processing module electrically connected to the antenna switching module and the wireless communication module, configured to control the first duplex circuit, the second duplex circuit and the fourth duplex circuit to control signal transmission of the wireless communication module through at least one of the first signal source, the second signal source, the fourth signal source, the fifth signal source, the sixth signal source and the seventh signal source,
wherein the antenna switching module selects the corresponding antenna unit for the signal transmission according to a communication signal strength.

8. The communication device according to claim 7, further comprising:
a wireless network module electrically connected to the fourth signal source selectively via the second duplex circuit, and electrically connected to the third signal source selectively via a third duplex circuit; and
a global positioning system (GPS) module electrically connected to the third signal source selectively via the third duplex circuit;
wherein the processing module is electrically connected to the wireless network module and the global positioning system (GPS) module, the processing module is configured to switch the second duplex circuit and the third duplex circuit to control signal transmission of the wireless network module through one of the third signal source and the fourth signal source, and signal transmission of the global positioning system (GPS) module through the third signal source.

* * * * *